(12) United States Patent
Liu et al.

(10) Patent No.: US 11,753,127 B1
(45) Date of Patent: Sep. 12, 2023

(54) MODULAR UNDERWATER ROBOT AND CONTROL METHOD THEREFOR

(71) Applicant: Guangzhou University, Guangzhou (CN)

(72) Inventors: Airong Liu, Guangzhou (CN); Jiaqiao Liang, Guangzhou (CN); Jiyang Fu, Guangzhou (CN); Bingcong Chen, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 18/298,741

(22) Filed: Apr. 11, 2023

(30) Foreign Application Priority Data

Jul. 19, 2022 (CN) .......................... 202210847667.X

(51) Int. Cl.
| | |
|---|---|
| *B63G 8/00* | (2006.01) |
| *B25J 9/08* | (2006.01) |
| *B63C 11/52* | (2006.01) |

(52) U.S. Cl.
CPC ............. *B63G 8/001* (2013.01); *B25J 9/08* (2013.01); *B63C 11/52* (2013.01); *B63G 2008/002* (2013.01)

(58) Field of Classification Search
CPC ...... B63C 11/52; B25J 9/08; B63G 2008/002; B63G 8/001; B63G 8/00
See application file for complete search history.

(56) References Cited

U.S. PATENT DOCUMENTS

| | | | |
|---|---|---|---|
| 2018/0154995 A1* | 6/2018 | Cole | ......................... B63G 8/22 |
| 2022/0119104 A1* | 4/2022 | Barnes | .................. B64C 39/024 |

FOREIGN PATENT DOCUMENTS

EP 2845793 A1 * 3/2015 ............. B63G 8/001

* cited by examiner

*Primary Examiner* — Stephen P Avila
(74) *Attorney, Agent, or Firm* — Getech Law LLC; Jun Ye

(57) ABSTRACT

The present invention discloses a modular underwater robot and a control method therefor. The modular underwater robot includes support plates, a first chamber, a second chamber, and a power assembly, where the supporting plates are stacked, and front end edges and rear end edges of the support plates are respectively provided with a first hollow portion and a second hollow portion; the first chamber is disposed in the first hollow portion; the second chamber is disposed in the second hollow portion, and the second chamber and the first chamber are in a same horizontal position; and the power assembly includes fixed vector thrusters and vertical thrusters. As such, the fixed vector thrusters can enable the modular underwater robot to move forward, backward, or rotatably, so that flexibility of the modular underwater robot can be improved.

10 Claims, 10 Drawing Sheets

MODULAR UNDERWATER ROBOT AND CONTROL METHOD THEREFOR

FIELD OF TECHNOLOGY

The present invention relates to the field of underwater robots, and in particular, to a modular underwater robot and a control method therefor.

BACKGROUND

The development of underwater robots can reduce people's work in a complex underwater environment, and reduce the risk of and costs for exploration. Collection of surrounding environment information by an underwater robot is easily affected, especially during exploration in the complex underwater environment, so that it is difficult to perform identification by an underwater exploration object. Moreover, most of traditional underwater robots are of three-dimensional structures, which are easy to encounter obstacles when they need to cross various slit terrains. Because of the influence of a whole structure of robot bodies, it is impossible to perform further exploration. Therefore, existing underwater exploration robots still have some limitations in the field of underwater exploration.

SUMMARY

To solve at least one of the above technical problems, the present invention provides a modular underwater robot and a control method therefor, and the adopted technical solutions are as follows:
the present invention provides a modular underwater robot, where the modular underwater robot includes support plates, a first chamber, a second chamber, and a power assembly, there are two support plates, the two support plates are stacked, and an interval exists between the two support plates, front end edges of the support plates are provided with a first hollow portion, and rear end edges of the support plates are provided with a second hollow portion, a blocking portion is disposed between the first hollow portion and the second hollow portion, and the blocking portion is configured to separate the first hollow portion from the second hollow portion, the support plates are provided with mounting holes, and the mounting holes are symmetrically disposed, four corners of the support plates are provided with inclined portions, and the inclined portions make angles with the front end edges of the support plates; the first chamber is disposed in the first hollow portion and configured to store a control component; the second chamber is disposed in the second hollow portion and configured to store an energy component, and the second chamber and the first chamber are in a same horizontal position; and the power assembly includes fixed vector thrusters and vertical thrusters, where each of the fixed vector thrusters is disposed at each of the inclined portions, and a pushing direction of each of the fixed vector thrusters is parallel to each of the inclined portions, each of the vertical thrusters is disposed in each of the mounting holes, and a pushing direction of each of the vertical thrusters is perpendicular to the support plates.

The embodiments of the present invention have at least the following beneficial effects: in the present invention, mounting positions of the first chamber, the second chamber, and the power assembly are reserved on the support plate, and the first chamber for storing a control component and the second chamber for storing an energy component are at a same height, so that an overall height of the modular underwater robot is reduced, and the modular underwater robot can easily enter and exit a narrow gap, and then universality can be improved; and The vertical thrusters provide power toward a vertical direction, can enable the modular underwater robot to dive or float up, and the fixed vector thrusters can enable the modular underwater robot to move forward, backward, or rotatably, so that motion at six-degree-of-freedom can be implemented, and flexibility of the modular underwater robot can be improved.

In some embodiments of the present invention, both ends of the first chamber are provided with end caps, and a first sealing structure is disposed between the end caps and an inner wall of the first chamber, an end cover at a first end of the second chamber is provided with a first orifice plate and a first flange, and the first orifice plate is connected to the first flange, both ends of the second chamber are provided with end caps, a second sealing structure is disposed between the end covers and an inner wall of the second chamber, an end cover at the first end of the second chamber is provided with a second orifice plate and a second flange, and the second orifice plate is connected to the second flange.

In some embodiments of the present invention, a second end of the first chamber is located at a front end of the support plate, a second end of the second chamber is located at a rear end of the support plate, and the first orifice plate and the second orifice plate are both provided with multiple via holes through which cables pass.

In some embodiments of the present invention, multiple connection portions are disposed between the two support plates, and each of the connection portions includes a support unit and a connection unit, the connection unit is located at both ends of the connection portion, and the support unit makes an angle with the connection unit.

In some embodiments of the present invention, both side edges of the support plates are provided with a third hollow portion, and the support plate is provided with a modular interface, and the modular interface is disposed at a position of the third hollow portion.

In some embodiments of the present invention, the modular underwater robot further includes a mechanical arm, and the mechanical arm includes a main shaft and a clamping structure, the main shaft is hollow, a traction rod is disposed on the main shaft, the traction rod is inserted into the main shaft, the traction rod can slide relative to the main shaft, and the clamping structure includes two clamping jaws, and each of the clamping jaws is hinged with the traction rod.

In some embodiments of the present invention, the support plate is provided with positioning components, and there are two position components, and one of the positioning portion includes an abutting portion and a bending portion, where the bending portion makes an angle with the abutting portion, the bending portion is connected to the support plate, and the two abutting portions are respectively abutted with outer side walls of the first chamber and the second chamber.

In some embodiments of the present invention, the positioning component is provided with an extendable connection rod, both ends of the extendable connection rod are respectively connected to the two positioning components, the extendable connection rod is provided with a connection structure, and the mechanical arm is connected to the extendable connection rod through the connection structure.

In some embodiments of the present invention, a second end of the first chamber is provided with a pan-tilt camera and a protective cover, and the pan-tilt camera is disposed in the protective cover.

The present invention provides a method for controlling a modular underwater robot, and the method for controlling the modular underwater robot includes the following steps:
- a control signal is sent to a relay terminal through a console by means of a 5G signal, and the relay terminal transmits the control signal to the modular underwater robot;
- the modular underwater robot receives input attitude information, collects current attitude information, and combines the current attitude information with an expected attitude to generate a deviation signal, so that the modular underwater robot is adjusted to an expected attitude;
- in case of an obstacle, the modular underwater robot captures a change in a size and driving speed of the obstacle, estimates a distance from the modular underwater robot to the obstacle, and generates an obstacle avoidance signal in an opposite direction; and
- when a defect enters a field of vision, an anchor frame is generated by a target recognition algorithm, a position of the defect is calibrated, an attitude of the modular underwater robot is adjusted according to the position of the defect, a target is placed in the center of the field of vision, and a characteristic value of the size of the defect is measured.

The embodiments of the present invention have at least the following beneficial effects: in the present invention, a motion signal is transmitted to the modular underwater robot through a relay terminal, so that multiple modular underwater robots can be controlled to move simultaneously; the modular underwater robot compares input attitude information with current attitude information, and adjusts an attitude of the modular underwater robot by using a deviation signal adjustment module, so that movement accuracy can be ensured; the modular underwater robot captures a distance from an obstacle and adjusts its attitude according to its own speed to avoid the obstacle accurately; and a specific shape of a defect is detected and identified by a computer vision algorithm for target recognition, which provides accurate guidance for repair work.

A part of additional aspects and advantages of the present invention will be set forth in the following description, and the part will be obvious from the following description, or will be learned by a practice of the present invention.

BRIEF DESCRIPTION OF THE DRAWINGS

The above and/or additional aspects and advantages of the present invention will become apparent and easy to understand from the description of embodiments in combination with the following drawings.

REFERENCE NUMERALS

Figure 1:
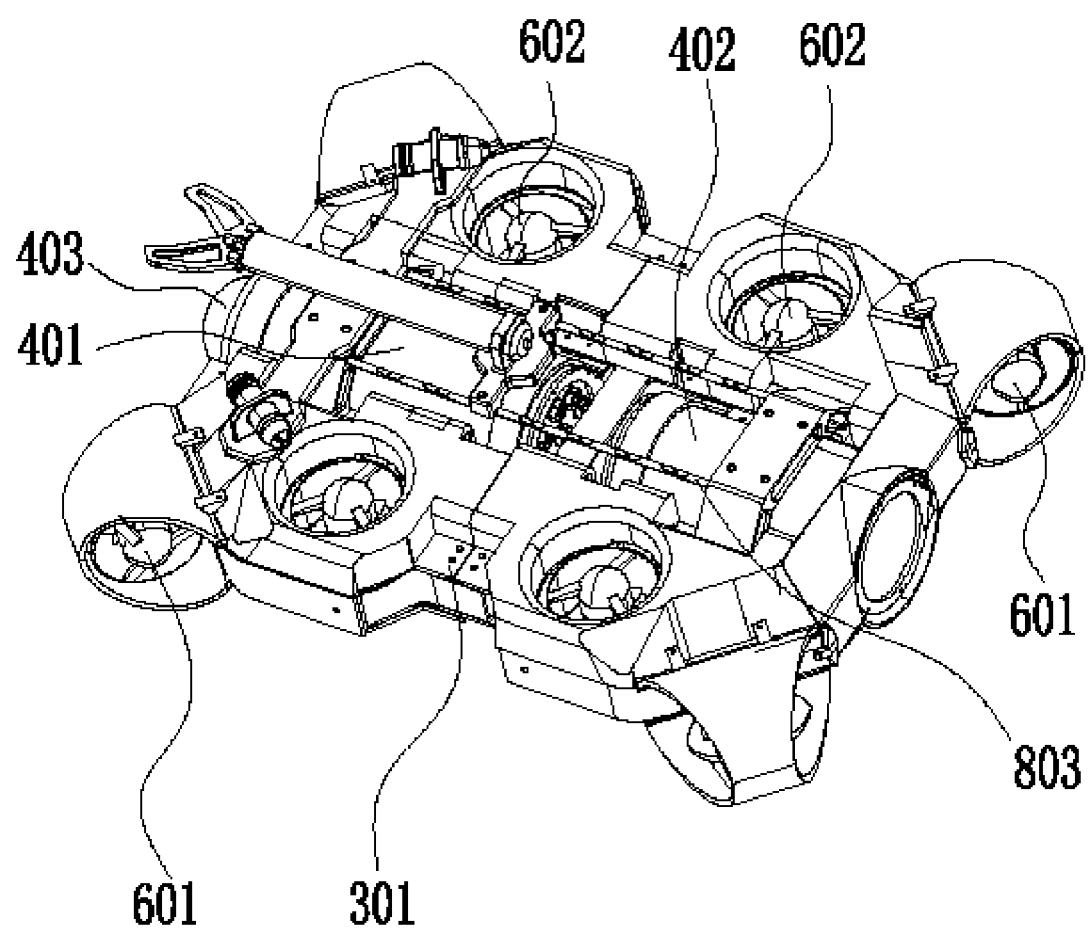
FIG. 1 is a schematic structural diagram of a modular underwater robot according to the present invention.

101. Support plate; 102. First hollow portion; 103. Second hollow portion; 104. Blocking portion; 105. Third hollow portion; 106. Mounting hole; 107. Inclined portion;
201. Support unit; 202. Connection unit;
301. Modular interface;
401. First chamber; 402. Second chamber; 403. Protective cover;
501. End cover; 502. First orifice plate; 503. First flange;
601. Fixed vector thruster; 602. Vertical thruster;
701. Main shaft; 702. Traction rod; 703. Clamping jaw;
801. Abutting portion; 802. Bending portion; 803. Extendable connection rod

DESCRIPTION OF THE EMBODIMENTS

Embodiments of the present invention will be described in detail with reference to FIG. 1 to FIG. 10, examples of embodiments are shown in the accompanying drawings, and same or similar reference numerals always mean same or similar elements or elements with the same or similar functions. Embodiments described below with reference to the accompanying drawings are exemplary, only for explaining the present invention, and should not be construed as a limitation to the present invention.

In the description of the present invention, it should be understood that orientation or position relationships indicated by terms such as "central", "central part", "longitudinal", "transverse", "length", "width", "thickness", "upper", "lower", "front", "rear", "left", "right", "vertical", "horizontal", "top", "bottom", "inside", "outside", "axial", "radial", "circumferential", and the like are orientation or position relationships based on the accompanying drawings and are to facilitate the description of the present invention and simplify the description only, rather than indicating or implying that the apparatus or element referred to must have a particular orientation or be constructed and operated in a particular orientation, and will not to be interpreted as limiting the present invention. Features defined with "first" and "second" are used to distinguish feature names, rather than having special meanings. In addition, features defined with "first" and "second" may include one or more of the features explicitly or implicitly. In the description of the present invention, unless otherwise specified, the meaning of "multiple" means two or more.

In the description of the present invention, it should be noted that unless otherwise specified and limited, the terms "mount", "connected", and "connect" should be understood in a broad sense, for example, they can be understood as: fixedly connected, detachably connected, or integrally connected; mechanically connected or electrically connected; directly connected or indirectly connected through an intermediate medium, or internal communication of two elements. For those of ordinary skill in the art, specific meanings of the above terms in the present invention may be understood according to specific circumstances.

As shown in FIG. 1, an embodiment of the present invention provides a modular underwater robot, and the modular underwater robot includes support plates 101, a first chamber 401, a second chamber 402, and a power assembly.

Figure 2:
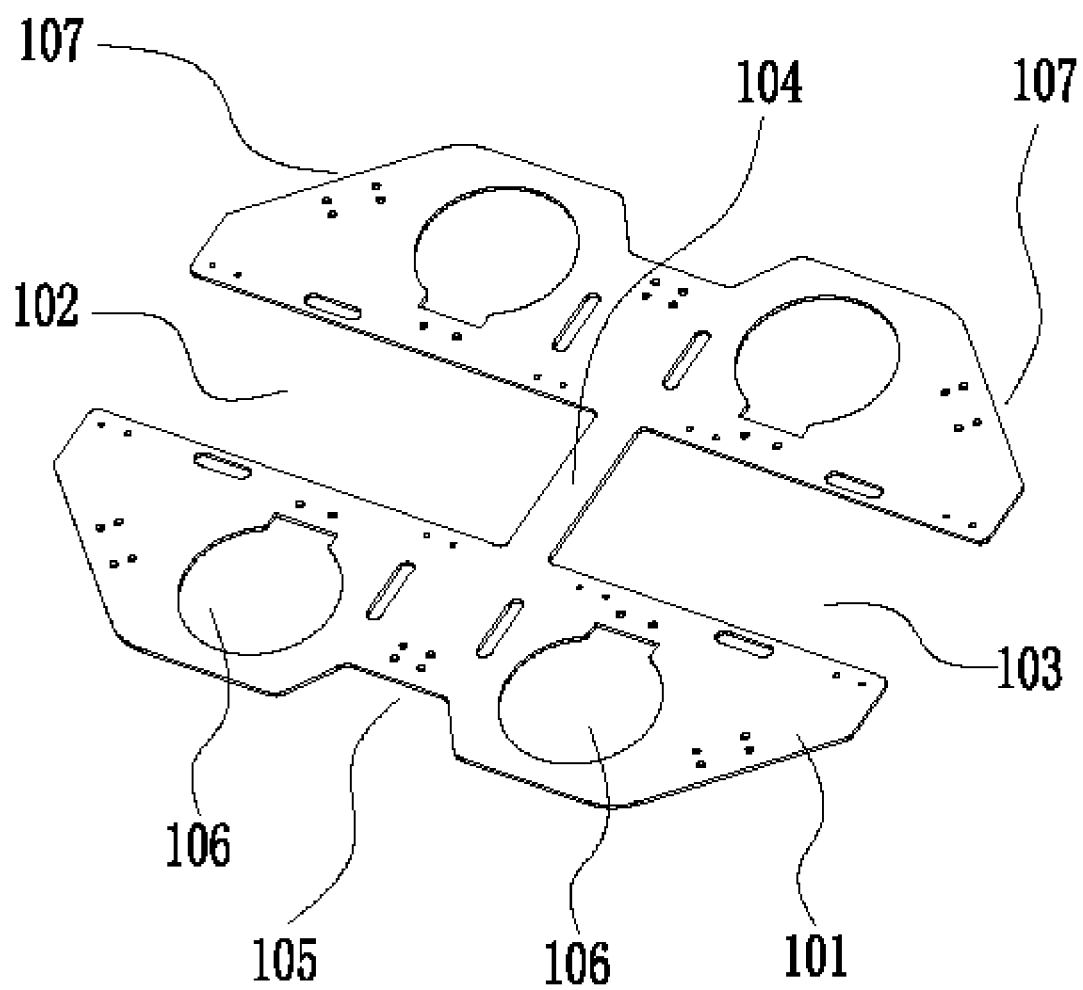
FIG. 2 is a schematic structural diagram of a support plate in a modular underwater robot according to the present invention.

As shown in FIG. 2, there are two support plates 101, and the two support plates 101 are stacked, there is a distance between the two support plates 101, and a region between the two support plates 101 is used for setting various working components. Further, the two support plates 101 are similar in shape. The support plates 101 are provided with a first hollow portion 102, and the first hollow portion 102 is configured to dispose the first chamber 401. The first chamber 401 is disposed in the first hollow portion 102. The support plates 101 are provided with a second hollow portion 103, the second hollow portion 103 is configured to dispose the second chamber 402, and the second chamber 402 is disposed in the second hollow portion 103. The first chamber 401 is configured to store a control assembly, and the second chamber 402 is configured to store an energy component. The control assembly includes conventional onboard elements such as a processor, an IMU sensor, and a temperature sensor, and the energy component includes a lithium battery.

Specifically, the first hollow portion 102 is disposed at front edges of the support plate 101, and the second hollow portion 103 is disposed at rear edges of the support plate 101, and the first hollow portion 102 is approximately aligned with the second hollow portion 103, and the first hollow portion 102 and the second hollow portion 103 are approximately on an axis of the modular underwater robot, so that the first chamber 401 and the second chamber 402 are approximately coaxial, and then the modular underwater robot has a less height. The two support plates 101 form a compact frame, to compress a longitudinal dimension of a robot body, which can help the modular underwater robot to enter narrow underwater space, improving performance of obstacle avoidance and crossing complex terrain. Thicknesses of the two support plates 101 can be further controlled, so that resistance born by the robot to water flow during underwater exploration is smaller, thereby saving energy and enabling navigation to be smoother. The two support plates 101 are made of aluminum alloy with high strength and light weight.

To ensure that the first chamber 401 and the second chamber 402 can work independently, a blocking portion 104 is disposed between the first hollow portion 102 and the second hollow portion 103, and the blocking portion 104 has a certain width, so as to prevent the first chamber 401 and the second chamber 402 from contacting each other and further influencing each other.

The support plates 101 are provided with mounting holes 106, and the mounting holes 106 are used for disposing the power assembly. To ensure that the power assembly can provide approximate power for each part of the modular underwater robot and prevent the modular underwater robot from tilting, the mounting holes 106 are symmetrically disposed, that is, the mounting holes 106 are symmetrical according to an axis of the modular underwater robot. It can be understood that there are at least two mounting holes 106. Specifically, there are four mounting holes 106.

Figure 3:
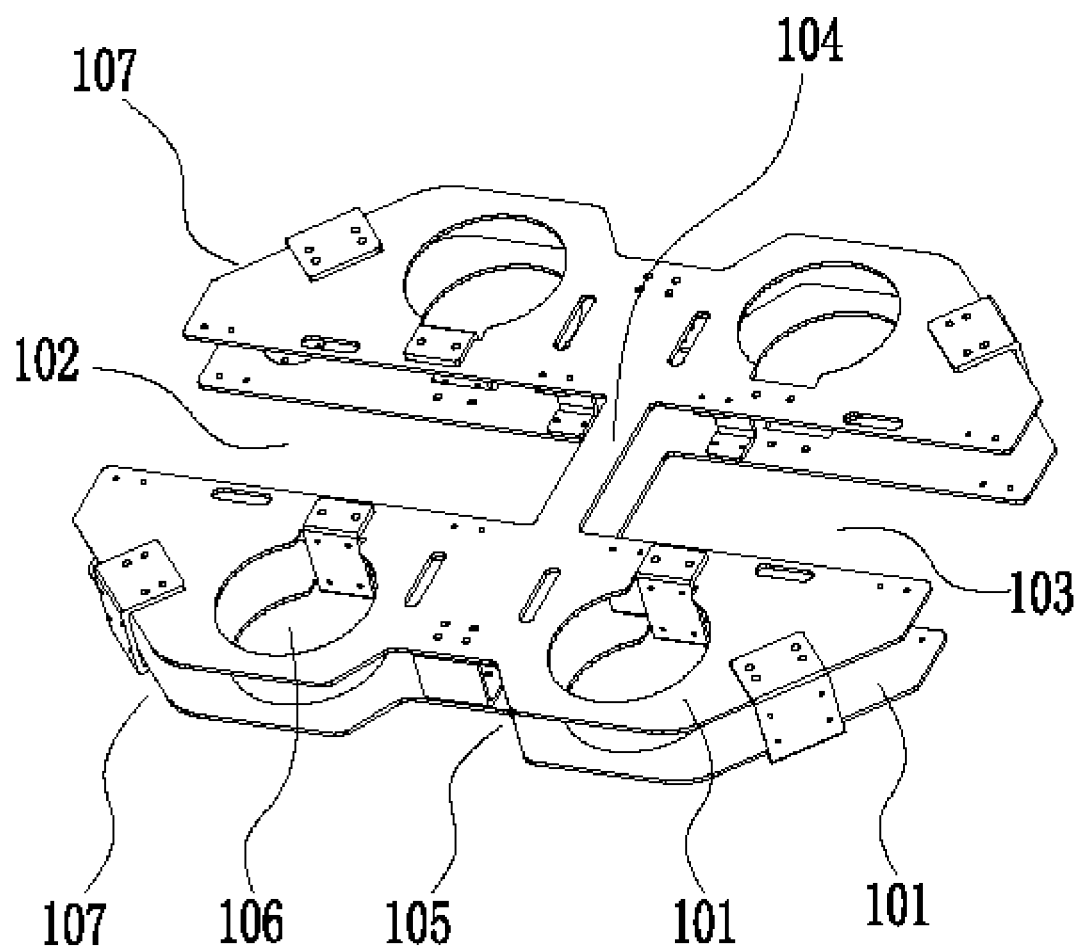
FIG. 3 is an assembly diagram of a support plate and a connection component in a modular underwater robot according to the present invention.

As shown in FIG. 3, in some examples, multiple connection components are disposed between the two support plates 101, and the two support plates 101 are connected by the connection components, and the distance between the two support plates 101 is kept. In addition, the connection components are configured to connect the first chamber 401, the second chamber 402, and the power assembly to the support plates 101. Specifically, edges of the first hollow portion 102, the second hollow portion 103, and the connection holes are all provided with connection components.

Figure 4:
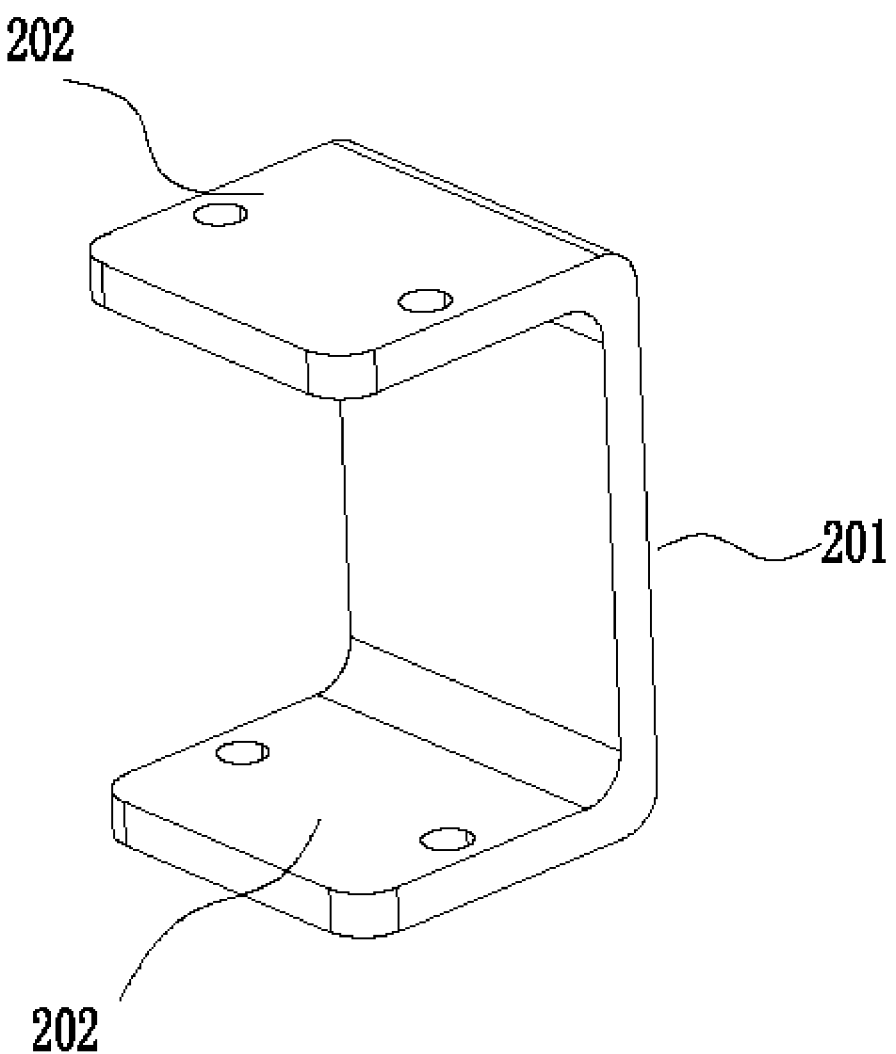
FIG. 4 is a schematic structural diagram of a connection component in a modular underwater robot according to the present invention.

As shown in FIG. 4, a connection component includes a support unit 201 and connection units 202, and the support unit 201 is connected to the connection units 202, the connection units 202 are at both ends of the connection component, and the support unit 201 makes an angle with the connection units 202. The support unit 201 is approximately perpendicular to the connection units 202 because the two support plates 101 are disposed in approximately parallel. Specifically, the support unit 201 and the connection units 202 are integrally formed and formed by bending a plate-like component.

In some examples, both side edges of the support plates 101 are provided with a third hollow portion 105, and the support plate 101 is provided with a modular interface 301. The modular interface 301 is disposed at a position of the third hollow portion 105, and the modular interface 301 is configured to expand a function of the modular underwater robot. Specifically, the modular interface 301 is connected to a pressure sensor, an ultrasonic sensor, and a Doppler sensor, and a connection component is also disposed at a position of the third hollow portion 105, so as to fix a position of an expansion module.

In some examples, a second end of the first chamber 401 is provided with a pan-tilt camera and a protective cover 403, and the pan-tilt camera is disposed in the protective cover 403. Specifically, the protective cover 403 is hemispherical and the protective cover 403 is made of tempered glass, which can protect a front end of the modular underwater robot from being damaged and help the pan-tilt camera monitor an environment in front of the modular underwater robot through the protective cover 403. The pan-tilt camera includes a steering gear, a shaft coupling, and a high-resolution camera. The steering gear is mounted at a position near the first chamber 401, so that the high-resolution camera faces a top of the protective cover 403. The shaft coupling connects the steering gear to the high-resolution camera. Specifically, the control assembly also includes an attitude sensor. When an attitude of the modular underwater robot shakes, the attitude sensor transmits error data to a pan/tilt, and then drives the high-resolution camera to deflect the attitude through the steering gear and shaft coupling, so that a shooting angle remains unchanged within a certain range.

Figure 5:
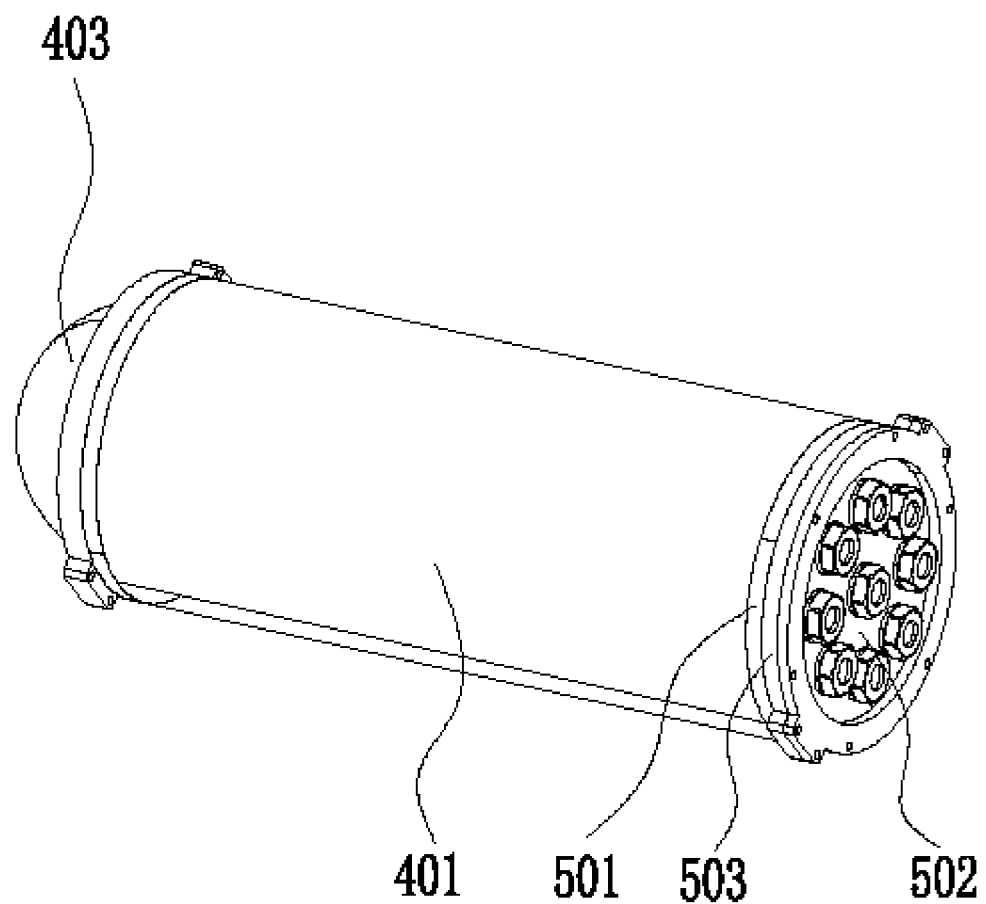
FIG. 5 is a schematic structural diagram of a first cabin in a modular underwater robot according to the present invention.

As shown in FIG. 5, in some examples, both ends of a first chamber 401 are provided with an end cover 501, and the end cover 501 covers the first chamber 401, so that relatively independent space is formed inside the first chamber 401, and normal operation of a control component in the first chamber 401 can be ensured. Specifically, to further ensure that the space in the first chamber 401 is sealed, a side wall of the end cover 501 is provided with a first sealing structure, and the first sealing structure is located between the end cover 501 and an inner wall of the first chamber 401. Specifically, the first sealing structure includes a sealing ring.

Figure 6:
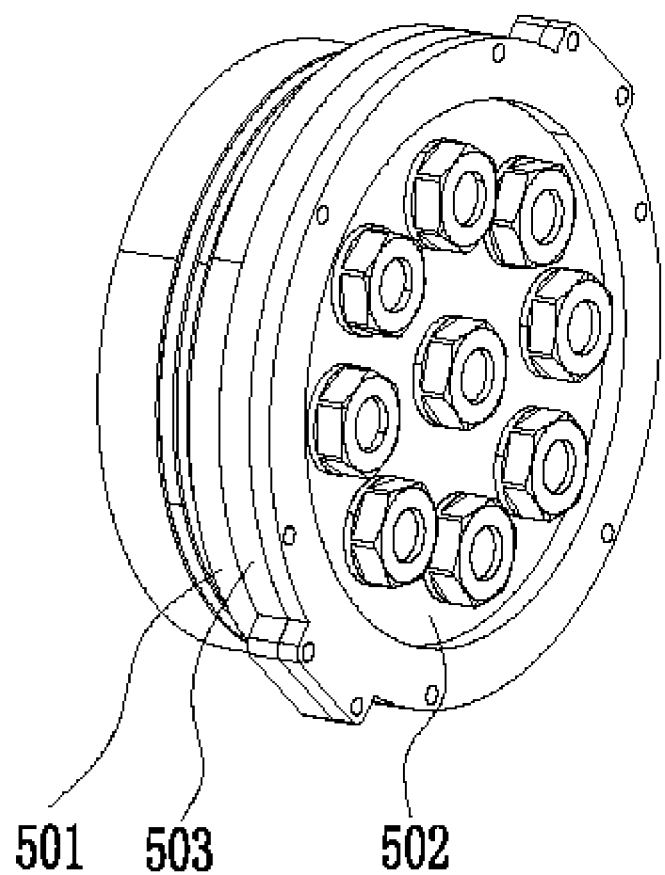
FIG. 6 is a schematic structural diagram of an end cover of a first cabin in a modular underwater robot according to the present invention.

As shown in FIG. 6, an end cover 501 at a first end of a first chamber 401 is provided with a first orifice plate 502 and a first flange 503. The first flange 503 is connected to an edge of the first orifice plate 502 by a fastener, and a cable can pass through the first orifice plate 502. A control component in the first chamber 401 is connected to an energy component in a second chamber 402 by a cable.

Both ends of a second chamber 402 are provided with the end cover 501, so that relatively independent space is formed in the second chamber 402, and normal operation of the energy component in the second chamber 402 can be ensured. A side wall of the end cover 501 is provided with a second sealing structure, and the second sealing structure is between the end cover 501 and an inner wall of the second chamber 402. Specifically, the second sealing structure includes a sealing ring.

The end cover 501 at a first end of the second chamber 402 is provided with a second orifice plate and a second flange, and the second flange is connected to an edge of the second orifice plate by a fastener, and a cable can pass through the second orifice plate.

Specifically, the first chamber 401 and the second chamber 402 are made of alloy with good thermal conductivity, and heat generated by a thermal effect of discharging by the energy component in the second chamber 402 is transferred to water through thermal conduction, thus creating a good working environment for the energy component.

It can be understood that, to reduce a wiring distance between the control module and the energy component, a second end of the first chamber 401 is located at front ends of support plates 101, and a second end of the second chamber 402 is located at rear ends of the support plates 101, and the first orifice plate 502 and the second orifice plate are both provided with multiple via holes through which cables are connected. In addition, the first chamber 401 and the second chamber 402 are fixed on the support plate 101 by the semi-annular steel rings which are symmetrical up and down, so that positions of the first chamber 401 and the second chamber 402 are stable.

A power assembly includes fixed vector thrusters 601 and vertical thrusters 602. The fixed vector thrusters 601 are configured to control the modular underwater robot to move forward, backward, or rotatably in the water, and the vertical thrusters 602 are configured to control the modular underwater robot to float up or dive in the water.

Specifically, the vertical thrusters 602 are disposed in mounting holes 106, and a pushing direction of the vertical thrusters 602 is approximately perpendicular to the support plates 101. Four corners of the support plates 101 are provided with inclined portions 107, and the inclined portions 107 make angles with front edges of the support plates 101. The fixed vector thrusters 601 are connected to the inclined portions 107, so that a pushing direction of the fixed vector thrusters 601 is approximately parallel to the inclined portions 107. That is, the pushing direction of the fixed vector thrusters 601 make angles with the front edges of the support plates 101. With the cooperation of four fixed vector thrusters 601, the modular underwater robot can move at multiple degrees of freedom.

Specifically, the vertical thrusters 602 are internally provided with bidirectional coaxial propellers, so that the pushing direction of the vertical thrusters 602 can be switched up and down. The fixed vector thrusters 601 are also internally provided with bidirectional coaxial propellers, so that the fixed vector thrusters 601 can be switched between two opposite opening directions, so as to prevent the robot body overturning from affecting an underwater exploration task and then improve movement flexibility of the modular underwater robot. Noise generated by the bidirectional coaxial propellers is small, so the noise has little impact on aquatic organisms, and no damage to a living environment of aquatic organisms is caused.

Figure 7:
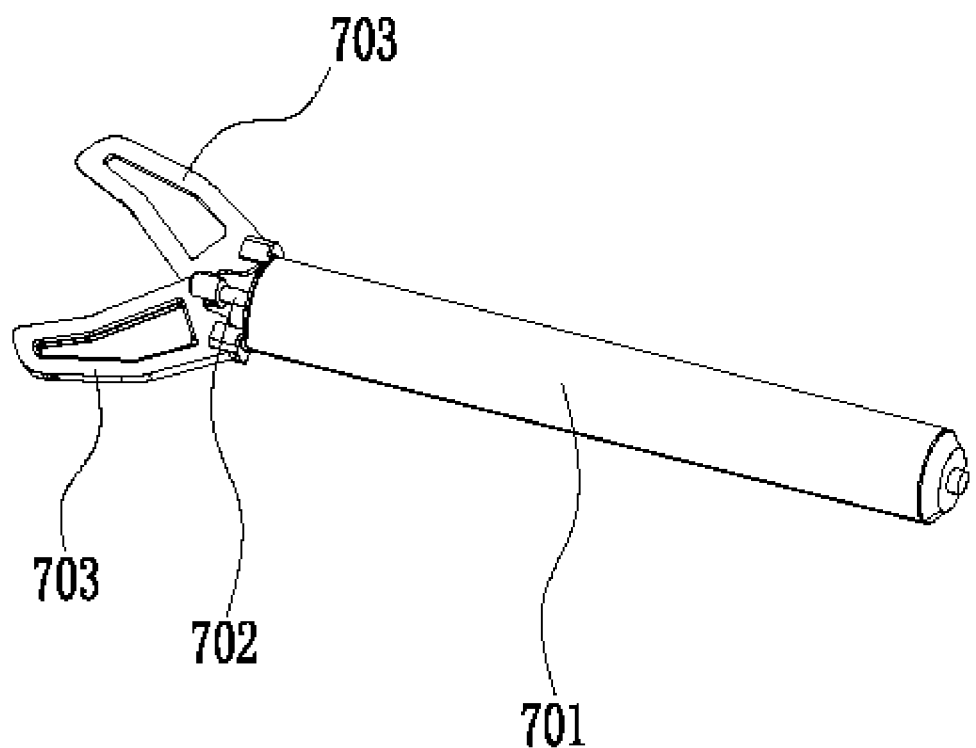
FIG. 7 is a schematic structural diagram of a mechanical arm in a modular underwater robot according to the present invention.

As shown in FIG. 7, in some examples, the modular underwater robot also includes a mechanical arm and the mechanical arm is disposed on a top surface or bottom surface of the modular underwater robot. The mechanical arm includes a main shaft 701, the main shaft 701 is hollow, and the main shaft 701 is internally provided with a traction rod 702. The traction rod 702 is inserted into the main shaft 701, and the traction rod 702 can move axially relative to the main shaft 701 to change a length of the traction rod 702 protruding from the main shaft 701. Specifically, an inner diameter of the main shaft 701 corresponds to an outer diameter of the traction rod 702, so that the traction rod 702 is prevented from shaking during movement.

The mechanical arm also includes a clamping structure, and the clamping structure includes two clamping jaws 703. The two clamping jaws 703 are respectively hinged to ends of the traction rod 702, and the two clamping jaws 703 are respectively hinged to ends of the main shaft 701. When the traction rod 702 moves outward from the main shaft 701, the clamping jaws 703 rotate, so that an angle between the jaws 703 increases. When the traction rod 702 moves toward an inside of the main shaft 701, the angle between the clamping jaws 703 decreases, achieving a clamping function.

Figure 8:
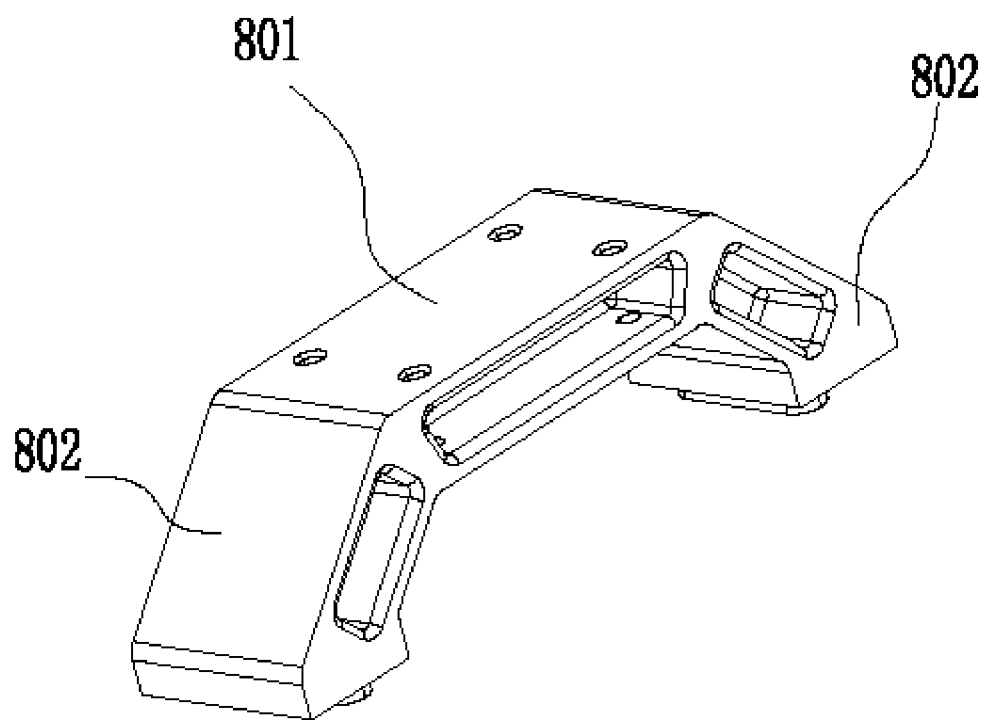
FIG. 8 is a structural schematic diagram of a positioning component in a modular underwater robot according to the present invention.

As shown in FIG. 8, in some examples, a support plate 101 is provided with a positioning component, and the positioning component is configured to dispose an extension module such as a mechanical arm. Specifically, there are two positioning components, and each of the positioning components includes an abutting portion 801 and a bending portion 802. The abutting portions 801 of the two positioning components respectively abut against side walls of a first chamber 401 and a second chamber 402, and the bending portion 802 make an angle with the abutting portion 801, so that the positioning components can be connected to the support plate 101. The positioning components protrude from the support plate 101 and cove a surface of the first chamber 401 or the second chamber 402. The positioning components can also protect the first chamber 401 or the second chamber 402 and prevent a foreign object from colliding with the first chamber 401 or the second chamber 402.

In some examples, one positioning component at a front end is provided with a connector, and the connector is equipped with symmetrically distributed high intensity searchlights. The high intensity searchlights are connected to a control module through cables, which can provide an effective field of vision of more than ten meters in a dark underwater environment, so as to find and check a possible reef or algae at the bottom of the water in time.

In some examples, two positioning components are connected by an extendable connection rod 803, the extendable connection rod 803 is provided with a connection structure, and extension modules such as the mechanical arm can be connected to the extendable connection rod 803 through the connection structure. Specifically, there are multiple connection structures distributed at different positions of the extendable connection rod 803, and the expansion modules can be connected through different connection structures to adjust the specific positions.

In some examples, a periphery of the modular underwater robot is wrapped with a polyethylene shell, and a gap between the shell and the robot body is filled with a foam board, thus generating a certain buoyancy and balancing some uneven loads. In addition, to facilitate transportation, an edge of the shell is provided with symmetrically distributed grips.

An embodiment of the present invention provides a method for controlling a modular underwater robot. A control signal is sent to a relay terminal through a console by means of a 5G signal, and the relay terminal transmits the control signal to the modular underwater robot.

Figure 9:
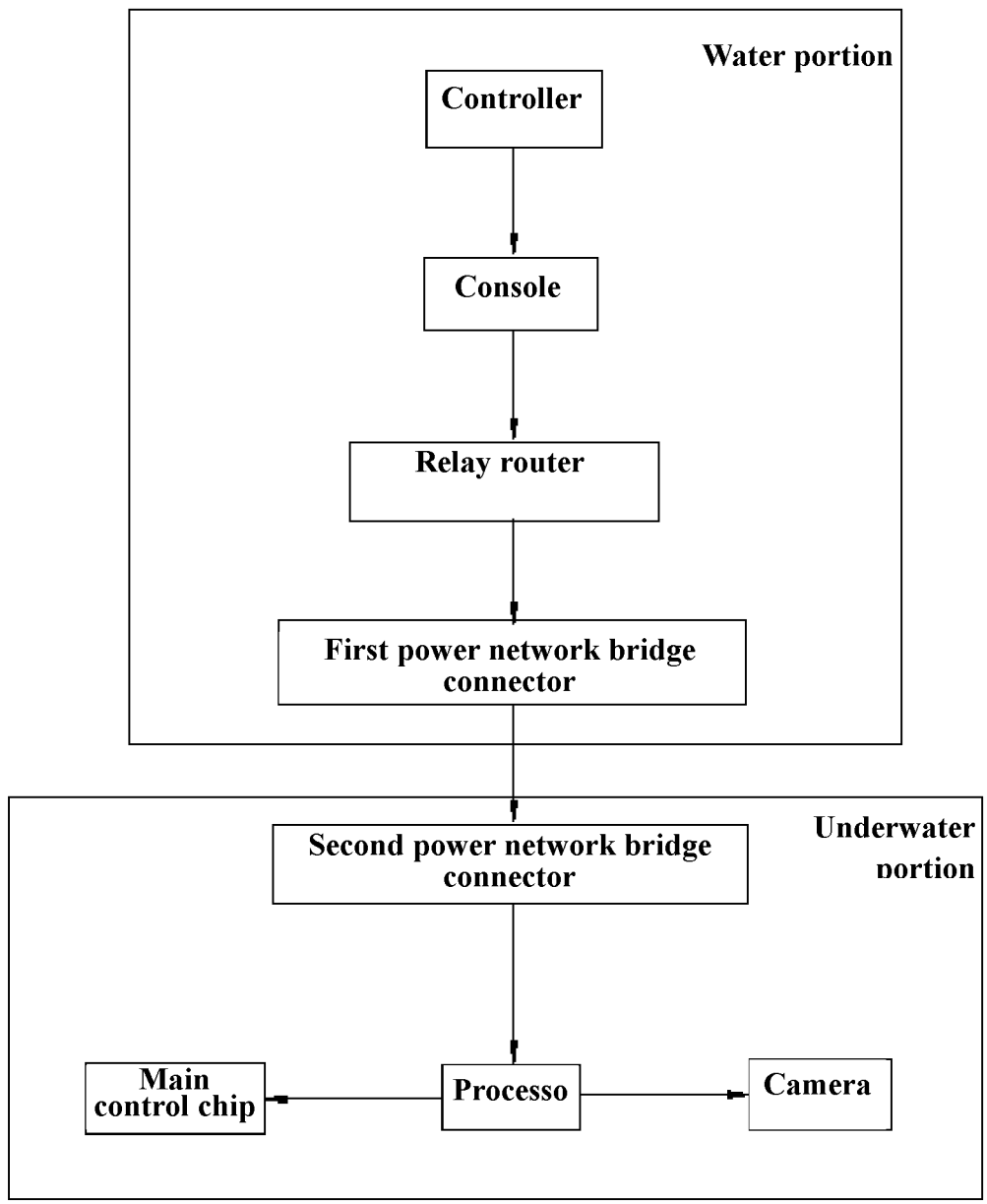
FIG. 9 is a flow chart of signal transmission of a method for controlling a modular underwater robot according to the present invention.

As shown in FIG. 9, signal transmission is divided into underwater transmission and water transmission. A water control station is controlled by a controller, and the control signal is sent to a relay router through the console by means of the 5G signal, and then transferred to a first power network bridge connector through a WAN port. Specifically, the relay terminal includes an unmanned ship, the unmanned ship has a communication capability and uses a buoyancy cable to transmit a signal to a second power network bridge connector of the modular underwater robot, and then to a processor of the modular underwater robot through an LAN port. After the control signal is analyzed, the analyzed control signal is uniformly allocated to a main control chip and camera module by the processor to complete a corresponding control flow. It can be implemented that signal transmission from the main console to the unmanned ship and then to each modular underwater robot, which can enhance control stability and a bandwidth, so that multiple modular underwater robots can be controlled simultaneously, and more controllable space can be provided for the modular underwater robots to work in groups and run in formation.

Figure 10:
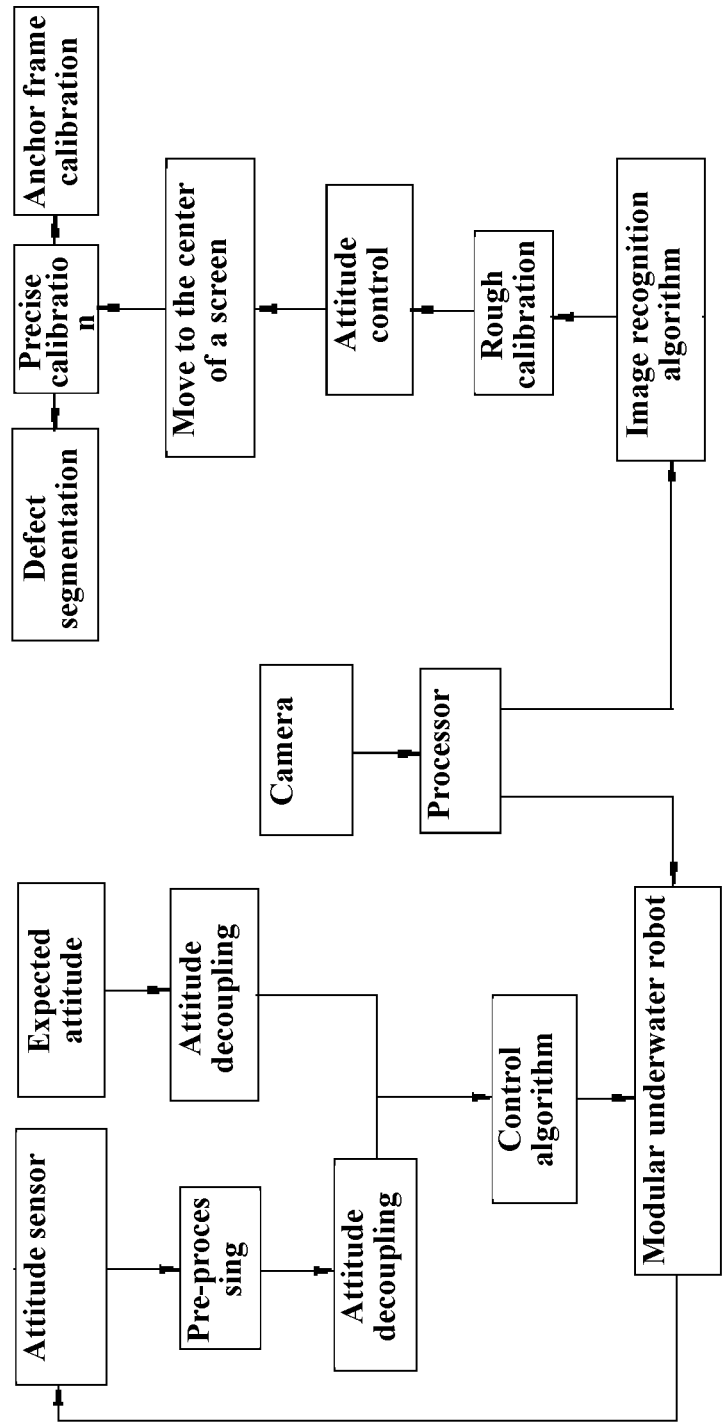
FIG. 10 is a control flow chart of a method for controlling a modular underwater robot according to the present invention.

As shown in FIG. 10, a modular underwater robot receives input attitude information from a water control station, and an attitude sensor inside the modular underwater robot captures current attitude information of the modular underwater robot, and carries out decoupling and other processing. The current attitude information and an expected attitude are combined and a deviation signal is generated, and the modular underwater robot is adjusted to an expected attitude through a control algorithm.

The modular underwater robot can implement obstacle avoidance. The obstacle avoidance is based on visual distance estimation. When there is an obstacle in front of the vision, the modular underwater robot captures a change in a size and driving speed of an obstacle, estimates a distance between the modular underwater robot and the obstacle, and generates an obstacle avoidance signal in an opposite direction, so that the modular underwater robot can make a corresponding avoidance attitude.

The modular underwater robot can implement defect detection and recognition. When a defect enters the field of vision, the robot captures a characteristic of the defect, generates an anchor frame by a target recognition algorithm, preliminarily calibrates a position of the defect, adjusts an attitude of the modular underwater robot according to the position of the defect, and places a target in the center of the field of vision, to minimize an image distortion area. Then, a precise calibration process is carried out, that is, more accurate anchor frame calibration of the defect is performed in the center, and image segmentation is performed on the defect in the anchor frame, and a characteristic value of the size of the defect is measured.

In the description of this specification, if reference terms "one embodiment", "some examples", "some embodiments", "an exemplary embodiment", "a specific example", or "some examples" appear, it means that a specific feature, structure, material, or characteristic described in combination with this embodiment or example are included in at least one embodiment or example of the present invention. In this specification, schematic expression of the above terms does not necessarily refer to a same embodiment or example. Furthermore, the specific feature, structure, material, or characteristic described may be combined in any one or more embodiments or examples in a proper manner.

The embodiments of the present invention have been described in detail with reference to the above drawings, but the present invention is not limited to the above embodiments, and various changes can be made within the knowledge of those skilled in the prior art without departing from the purpose of the present invention.

What is claimed is:

1. A modular underwater robot, comprising:
   support plates, wherein there are two support plates, the two support plates are stacked, and an interval exists between the two support plates, front end edges of the support plates are provided with a first hollow portion, and rear end edges of the support plates are provided with a second hollow portion, a blocking portion is disposed between the first hollow portion and the second hollow portion, and the blocking portion is configured to separate the first hollow portion from the second hollow portion, the support plates are provided with mounting holes, and the mounting holes are symmetrically disposed, four corners of the support plates are provided with inclined portions, and the inclined portions make angles with the front end edges of the support plates;
   a first chamber, wherein the first chamber is disposed in the first hollow portion and configured to store a control component;
   a second chamber, wherein the second chamber is disposed in the second hollow portion and configured to store an energy component, and the second chamber and the first chamber are in a same horizontal position; and
   a power assembly, comprising fixed vector thrusters and vertical thrusters, wherein each of the fixed vector thrusters is disposed at each of the inclined portions, and a pushing direction of each of the fixed vector thrusters is parallel to each of the inclined portions, each of the vertical thrusters is disposed in each of the mounting holes, and a pushing direction of each of the vertical thrusters is perpendicular to the support plates.

2. The modular underwater robot according to claim 1, wherein both ends of the first chamber are provided with end caps, a first sealing structure is disposed between the end covers and an inner wall of the first chamber, an end cover at a first end of the first chamber is provided with a first orifice plate and a first flange, the first orifice plate is connected to the first flange, both ends of the second chamber are provided with end caps, a second sealing structure is disposed between the end covers and an inner wall of the second chamber, an end cover at the first end of the second chamber is provided with a second orifice plate and a second flange, and the second orifice plate is connected to the second flange.

3. The modular underwater robot according to claim 2, wherein a second end of the first chamber is located at a front end of the support plate, a second end of the second chamber is located at a rear end of the support plate, and the first orifice plate and the second orifice plate are both provided with multiple via holes through which cables pass.

4. The modular underwater robot according to claim 1, wherein multiple connection portions are disposed between the two support plates, and each of the connection portion comprises a support unit and a connection unit, the connection unit is located at both ends of the connection portion, and the support unit makes an angle with the connection unit.

5. The modular underwater robot according to claim 1, wherein both side edges of the support plate are provided with a third hollow portion, and the support plate is provided with a modular interface, and the modular interface is disposed at a position of the third hollow portion.

6. The modular underwater robot according to claim 1, wherein the modular underwater robot further comprises a mechanical arm, and the mechanical arm comprises a main shaft and a clamping structure, the main shaft is hollow, a traction rod is disposed on the main shaft, and the traction rod is inserted into the main shaft, the traction rod can slide relative to the main shaft, and the clamping structure comprises two clamping jaws, and each of the clamping jaws is hinged with the traction rod.

7. The modular underwater robot according to claim 6, wherein the support plate is provided with positioning components, and there are two position components, and one of the positioning portion comprises an abutting portion and a bending portion, wherein the bending portion makes an angle with the abutting portion, the bending portion is connected to the support plate, and the two abutting portions are respectively abutted with outer side walls of the first chamber and the second chamber.

8. The modular underwater robot according to claim 7, wherein the positioning component is provided with an extendable connection rod, both ends of the extendable connection rod are respectively connected to the two positioning components, the extendable connection rod is provided with a connection structure, and the mechanical arm is connected to the extendable connection rod through the connection structure.

9. The modular underwater robot according to claim 1, wherein a second end of the first chamber is provided with a pan-tilt camera and a protective cover, and the pan-tilt camera is disposed in the protective cover.

10. A method for controlling a modular underwater robot, comprising:
support plates, wherein there are two support plates, the two support plates are stacked, and an interval exists between the two support plates, front end edges of the support plates are provided with a first hollow portion, and rear end edges of the support plates are provided with a second hollow portion, a blocking portion is disposed between the first hollow portion and the second hollow portion, and the blocking portion is configured to separate the first hollow portion from the second hollow portion, the support plates are provided with mounting holes, and the mounting holes are symmetrically disposed, four corners of the support plates are provided with inclined portions, and the inclined portions make angles with the front end edges of the support plates;

a first chamber, wherein the first chamber is disposed in the first hollow portion and configured to store a control component;

a second chamber, wherein the second chamber is disposed in the second hollow portion and configured to store an energy component, and the second chamber and the first chamber are in a same horizontal position; and a power assembly, comprising fixed vector thrusters and vertical thrusters, wherein each of the fixed vector thrusters is disposed at each of the inclined portions, and a pushing direction of each of the fixed vector thrusters is parallel to each of the inclined portions, each of the vertical thrusters is disposed in each of the mounting holes, and a pushing direction of each of the vertical thrusters is perpendicular to the support plates, wherein:

a control signal is sent to a relay terminal through a console by means of a 5G signal, and the relay terminal transmits the control signal to the modular underwater robot;

the modular underwater robot receives input attitude information, collects current attitude information, and combines the current attitude information with an expected attitude to generate a deviation signal, so that the modular underwater robot is adjusted to an expected attitude;

in case of an obstacle, the modular underwater robot captures a change in a size and driving speed of the obstacle, estimates a distance from the modular underwater robot to the obstacle, and generates an obstacle avoidance signal in an opposite direction; and when a defect enters a field of vision, an anchor frame is generated by a target recognition algorithm, a position of the defect is calibrated, an attitude of the modular underwater robot is adjusted according to the position of the defect, a target is placed in the center of the field of vision, and a characteristic value of the size of the defect is measured.

* * * * *